(No Model.) 8 Sheets—Sheet 1.

E. B. HAYES.
DOUBLE PLANER AND SANDER.

No. 590,836. Patented Sept. 28, 1897.

Fig. 1.

WITNESSES
INVENTOR
Eli B. Hayes
by his Attorneys
Mason, Fenwick & Lawrence (No Model.) 8 Sheets—Sheet 2.

E. B. HAYES.
DOUBLE PLANER AND SANDER.

No. 590,836. Patented Sept. 28, 1897.

Fig. 2.

WITNESSES
INVENTOR
Eli B. Hayes
by his Attorneys
Mason, Fenwick & Lawrence (No Model.) 8 Sheets—Sheet 3.

E. B. HAYES.
DOUBLE PLANER AND SANDER.

No. 590,836. Patented Sept. 28, 1897.

Fig. 3.

WITNESSES
Severance
W. Harvey Muzzy

INVENTOR
Eli B. Hayes
by his attorneys
Mason, Fenwick & Lawrence (No Model.) 8 Sheets—Sheet 5.

E. B. HAYES.
DOUBLE PLANER AND SANDER.

No. 590,836. Patented Sept. 28, 1897.

WITNESSES

INVENTOR (No Model.) 8 Sheets—Sheet 6.

E. B. HAYES.
DOUBLE PLANER AND SANDER.

No. 590,836. Patented Sept. 28, 1897.

WITNESSES
INVENTOR

(No Model.) 8 Sheets—Sheet 7.

E. B. HAYES.
DOUBLE PLANER AND SANDER.

No. 590,836. Patented Sept. 28, 1897.

WITNESSES
Severance
W. Harry Muzzy

INVENTOR
Eli B. Hayes
by his Attorneys
Mason, Fenwick and Lawrence

UNITED STATES PATENT OFFICE.

ELI B. HAYES, OF OSHKOSH, WISCONSIN.

DOUBLE PLANER AND SANDER.

SPECIFICATION forming part of Letters Patent No. 590,836, dated September 28, 1897.

Application filed July 17, 1896. Serial No. 599,540. (No model.)

*To all whom it may concern:*

Be it known that I, ELI B. HAYES, a citizen of the United States, residing at Oshkosh, in the county of Winnebago and State of Wisconsin, have invented certain new and useful Improvements in Double Planers and Sanders; and I do hereby declare the following to be a full, clear, and exact description of the invention, such as will enable others skilled in the art to which it appertains to make and use the same.

My invention relates to improvements in planing and sanding machines, and has more particular relation to machines in which both sides of the lumber are planed and sanded.

The invention consists of the combination, with a suitable frame, of upper and lower planers, upper feeding-rollers normally rigid against vertical movement, and lower feeding-rollers capable of vertical movement under a yielding tension, whereby all excess of thickness of the lumber is taken off by the lower planer.

The invention also consists of the combination, with a suitable frame, of upper and lower planers, upper feeding-rollers normally rigid against vertical movement, a gage-plate above the lower planer, means for adjusting said gage-plate and feed-rollers simultaneously, and lower feeding-rollers supported under yielding tension.

The invention also consists of certain other novel constructions, combinations, and arrangements of parts, all of which will be hereinafter more particularly set forth and claimed.

In the accompanying drawings, forming part of this specification.

A in the drawings represents the frame of the machine; B B', the upper and lower planers, respectively; C C, the upper feed-rollers; D D, the lower feed-rollers; E E, the lower sand-cylinders; F F, the upper sand-cylinders, and G the belt-tightening device.

A shaft A' is suitably journaled in the frame A at one end of the same and is provided with gear-wheels $a$ $a'$, said wheels being arranged at the opposite ends of the said shaft. The wheel $a$ is in mesh with a small pinion $a^2$, fast to a large gear-wheel $a^3$, which latter is suitably journaled on the frame A. This wheel $a^3$ is in mesh with a small pinion $a^4$, fast upon one end of a power-shaft $a^5$, which is suitably journaled in the frame A. The opposite end of said shaft is provided with a loose and a fast belt-wheel $a^6$ and $a^7$, respectively, said wheels being applied in the usual manner to said shaft. A crossed belt K connects the belt-wheels with a belt-wheel L, mounted upon the main power-shaft L'. This belt K is shifted from the loose to the fixed pulley, and vice versa, by means of a bell-crank lever $l$, suitably pivoted upon a portion of the frame and provided with upwardly-extending arms $l'$, that engage the belt to shift the same. This bell-crank lever is operated by a hand-lever $l^2$, mounted upon a transverse shaft $l^3$ and connected thereto by a link $l^4$.

The upper feeding-rollers C C are of any suitable and desired construction and are rigidly mounted upon shafts $c$ $c$. These shafts are journaled in the outer ends of lever journal-boxes $c'$ $c'$ and are each provided at one end with a gear-wheel $c^{16}$, said gears meshing with a gear $a^\times$ and receiving power therefrom. This gear $a^\times$ is mounted upon a transverse shaft $A^{11}$ and meshes continually with the gear $a'$, thereby receiving its power. The inner ends of lever journal-boxes $c'$ are independently and pivotally mounted upon the shaft $A^{11}$, so that the feed-rollers may be moved up and down in an arc the center of which is the said shaft. The rollers are moved up and down simultaneously and to an equal extent by vertical screws $c^2$, that are journaled in extended portions $a^{12}$ of the frame and have their lower reduced ends seated in blocks $a^{13}$, also mounted on said frame A. Each of the screws $c^2$ is provided at its upper end with a bevel-pinion $c^3$, the pinions of one side being connected, so as to revolve together, by a rod $c^4$, journaled in arms $a^{14}$ of the frame and provided with bevel-pinions $c^5$, adapted to engage the respective bevel-pinions on the vertical shafts.

The vertical shafts on the opposite side of the machine are connected in the same manner, with the exception that the rod is extended and formed with a square end $c^6$, whereby a handle may be fitted to the same to revolve it. The pinions on the vertical shafts of the respectives sides of the machine are connected, so that they are all revolved together and to an equal extent, by a lateral rod or shaft $c^7$, that is mounted in suitable brackets $c^8$ of the frame and is provided with bevel-pinions $c^9$, that engage the bevel-pinions on two of the vertical shafts upon the opposite sides of the machine. Each of the journal-boxes $c'$ is provided at its outer end with two spaced lugs $c^{10}$ $c^{10}$, formed with horizontal slots $c^{11}$. Blocks $c^{12}$ are mounted between each of said pairs of lugs by means of trunnions $c^{13}$, with which they are provided, projecting into the said horizontal slots. Each of these blocks is provided with a central screw-threaded passage $c^{14}$, through which one of the vertical screws passes.

It will be observed from the above that when the vertical shafts are revolved simultaneously, as before described, the blocks $c^{12}$ are moved up or down on the screws, and thus move the lever journal-boxes, carrying the feeding-rollers with them, the slots in the blocks $c^{12}$ allowing the rollers to rise in an arc, while the operating-screws $c^2$ still retain their vertical positions. The shafts $c$ $c$ of the upper feeding-rollers are extended beyond their journal-boxes, so as to form supporting means for the gage-supporting plates H H, which are loosely mounted thereon. These plates extend forward on each side of the machine and terminate over the lower planer to support a gage or pressure plate H'. This plate comprises a lower portion $h$, having a strengthening-rib $h'$ extending longitudinally across its upper surface, and it is supported in position by arms $h^2$, pivotally mounted on the plates H H, so said pressure-plate may be thrown up out of the way when so desired by simply shifting it on its pivot. The plate is prevented from dropping too low at its outer edge by a bolt $h^3$, which passes through the arms $h^2$ and engages notches $h^5$, cut in the upper edge of the extended portion of frame.

It will be observed from the above that as the upper feeding-rollers move up and down upon being adjusted the said plate H' moves with them, so that it is always in the same horizontal plane with their feeding-surfaces. By means of this plate the thickness of the finished lumber is regulated, the lower the gage-plate the thinner the lumber, and vice versa.

The lower pressure and feed rollers D D are mounted upon shafts $d$ $d$, which in turn have their ends mounted in sliding blocks $d'$ $d'$, that are adapted to reciprocate up and down in guides $d^2$ $d^2$ at each side of the frame A. The said feed-rollers are held normally up, but under a yielding pressure, by pivoted levers $d^3$ $d^3$, that are rigidly mounted upon the opposite ends of shafts $d^5$ and are connected to said sliding blocks by vertical links $d^4$ $d^4$. The pivoted levers $d^3$ upon opposite sides of the machine are connected by lateral shafts $d^5$ $d^5$, upon which they are mounted, whereby said levers move in unison. Said levers $d^3$ upon one side of the machine receive motion from pendent links $d^6$ $d^6$, connected at their lower ends by a horizontal link $d^7$. This latter link is held normally down under a yielding pressure by a pivoted weighted lever $d^8$, connected thereto by a link $d^9$.

The effect of the above-described construction is to always hold the rollers D D up firmly against the lower side of the lumber, but with a yielding pressure that will permit them to descend instantly to accommodate any unusual or changing thickness of the wood as it is fed into the machine.

The lower planer B' is situated below the gage-plate H', and comprises a core or shaft $b$, that is journaled within boxes $b'$ $b'$, suitably secured to the frame A. The middle portion of the core is rectangular in cross-section and is grooved at its longitudinal edges, as at $b^2$, said grooves being angular in formation and adapted to receive similarly-shaped flanges formed on the longitudinal edges of the knife-carrying slides $b^3$ $b^3$. The shaft $b$ is provided with a central longitudinal passage $b^6$, in which is mounted a rotatable screw $b^7$, that is formed with a squared end $b^8$ for receiving a wrench to revolve it and is held in position in said shaft by a nut $b^\times$, that screws into the end of the shaft and engages a collar $b^0$, mounted on said screw. It will thus be seen that the screw $b^7$ is held against longitudinal movement in the shaft $b$, but can be revolved when desired. This screw passes through block $b^9$, that is adapted to slide longitudinally in a slot $b^{10}$ of the core. The slides $b^3$ $b^3$ on the opposite sides of the core are connected to the opposite sides of the block $b^9$ and move therewith when the screw $b^7$ is rotated. Bevel-cornered cutting-knives $b^{11}$ $b^{11}$ are mounted upon each of said slides $b^3$ $b^3$ by bolts $b^{12}$ $b^{12}$, that pass through slots $b^{13}$ $b^{13}$ cut therein. By means of this latter construction the knives may be adjusted upon the said slides backward and forward, so as to cut to a greater or less depth. These knives are set in grooves $b^{15}$ $b^{15}$, formed in the slides $b^3$ and having inclined bottom surfaces which cause one edge of the knife to sink lower than the other. The effect of this construction when the cutter is in operation is to cut a shearing cut on an incline at each edge of the panel, and thus form a wedge-shaped edge in the finished panel.

Knives L L, similar in shape to knives $b^{11}$ $b^{11}$, are mounted upon the same sides of the core as knives $b^{11}$, but at the opposite ends from the same. These knives are mounted directly upon the core in grooves similar to those occupied by knives $b^{11}$, but they have no slides and are capable of no longitudinal movement. The object in having the knives $b^{11}$ adjustable longitudinally upon the core or shaft is to accommodate different widths of panels by increasing or decreasing the space between said knives.

Longitudinal cutting-knives $b^5$ $b^5$ are secured upon the sides of the core not occupied by the knives $b^3$ by bolts $b^4$, which pass through slots $b^*$ and hold the same rigidly in position. These knives extend over the full length of the core, lapping over the edges of the slides $b^3$ and projecting sufficiently beyond the edge of the core to form a free cutting edge. The knives $b^{11}$ of course extend to a greater degree over the edge of the core than the knives $b^5$, as their office requires them to cut deeper into the lumber than said latter knives.

A chip-breaker M is located between the feed-rollers and the lower planer and in proximity to the latter. This breaker comprises a platform $m$, having a slight incline upward toward its forward edge and provided with pendent angular supporting-arms $m'$, which, as shown in the drawings, are keyed to a shaft pivoted in the frame at their lower ends in such manner that the platform may rise and fall in a larger arc than that described by the knives of the cutter. The object of this construction is to always keep the platform out of the path of the cutters no matter how much it may rise and fall. The platform is limited in its upward movement by a set-screw $m^2$ on each side, which are adapted to engage a portion of frame A. The platform is held normally up against the under side of the lumber by a weighted lever $m^3$ on each side, pivoted on the frame and provided at its forward end with a vertical link $m^4$, that is adapted to bear against the under side of a portion of said chip-breaker and support it under a yielding tension.

It will be observed that the platform of the chip-breaker engages the lumber at its forward edge only because of its peculiar inclined construction, and thus the chip cut by the planer is broken off evenly by this approximately knife-edge contact.

It will also be observed from the aforegoing that after the distance between the gage-plate H' and the lower cutter has been adjusted there will be no more vertical movement of either the upper feed-rollers or said gage-plate, and any excess of thickness of the lumber will be accommodated by the yielding lower feed-rollers and the yielding chip-breaker, this excess of thickness being then removed from the under side of the lumber by the lower cutter or planer.

The upper cutter or planer B is similar in construction to the cutter B', but is mounted in journal-boxes $b^{16}$, that are provided with downwardly-projecting slides $b^{17}$, that slide in suitable grooves of the frame A and rest against upwardly-projecting inclined standards $b^{18}$. Each of the slides $b^{17}$ is provided with a lateral projection $b^{19}$, that is engaged by an adjusting-screw $b^{20}$. Each of these screws is suitably journaled on its inclined standard and provided at its lower end with a bevel-pinion $b^{21}$, said bevel-pinions engaging bevel-pinions $b^{22}$ $b^{22}$ on the opposite ends of a lateral shaft $b^{23}$, which shaft is mounted in pendent projections $b^{24}$ of the frame A. One end of this shaft is squared, as at $b^{25}$, to permit a handle or wrench to be applied thereto to turn it. The revolution of the shaft operates the screws $b^{20}$ simultaneously, and thus raises the planer evenly at both ends.

A chip-breaker $b^{26}$, comprising a downwardly-curved plate adapted to rest upon the top of the lumber, is mounted in proximity to the upper cutter by means of pivoted levers $b^{27}$, said levers being joined at their outer free ends by an adjustable weighted cross-bar $b^{28}$, to which said chip-breaker is attached. By means of this construction the chip-breaker is always held down to its work under a yielding pressure. Just forward of the upper planer I arrange a pressure-plate M'. This plate is supported by cross-plates $m^5$, that are provided with upwardly-projecting guiding-arms $m^6$, that slide in guides $m^7$, that are supported by angular arms $m^8$, mounted upon slides $b^{17}$, so as to move therewith. The upper ends of the guides $m^7$ are bent forward and provided with screw-threaded apertures for receiving adjusting-screws $m^9$, that screw into the upper ends of the arms $m^6$.

It will be noticed from the above that the pressure-plate M' may be raised or lowered at will by means of the adjusting-screws and also that said pressure-plate moves with the upper planer as it is adjusted vertically.

Just below the upper cutter B' is arranged a guiding and supporting plate N, that is adapted to fit the contour of the under side of the lumber which has already been shaped and planed by the lower planer. This plate comprises a base portion $n$, whose sides are flared outward at their tops to form attaching means for the several detachable surface-strips $n^8$, the strips forming the central portion being each provided at each end with a downwardly and inwardly projecting lug $n^2$, said lugs being adapted to be slipped over the overhanging edges of the base portion and thus hold the strips in position, but allow them to be slipped off the same laterally.

Each one of the detachable strips is provided with a securing-bolt $n^3$, that is adapted to engage the under side of one of the overhanging sides of the base portion and thus hold said strip firmly in position. The extreme side strips $n^4$, which are formed to fit the contour of the beveled edges of the lumber, are adjusted vertically upon the base by means of longitudinally-movable wedges $n^5$, applied beneath the same and adapted to engage the lower inclined surfaces of the same. These wedges are each moved longitudinally to effect the desired adjustment by means of screws $n^6$, that pass through nuts $n^7$ of said end strips and engage screw-threaded recesses in said wedges. The rear ends of these end strips are secured to the base in the same manner as the middle strips, but their forward ends are secured under the overhanging edges of base by bolts $n^9$ $n^9$ alone, so that said strips may be allowed to rise when the wedges are being operated.

The object in having the surface of the support formed of strips is to provide for different widths of panels to be planed, for by removing the desired number of said strips the support may be made any width desired. When the depth of the cut at the sides of the panel is decreased or increased, the end strips of the support are adjusted accordingly by means of the wedges, as before described. It will be observed that this supporting-platform is situated below the upper cutter and is adapted to perfectly fit the contour of the under side of the panel, so as to form a firm solid support for the panel while it is being planed upon its upper surface.

Each end of the shaft of each planer is provided with a flanged belt-wheel N' N' and $N^2$ $N^2$, respectively.

After the panel leaves the second cutter it is ready to be sanded. This sanding is accomplished by the sanding rollers or cylinders E E and F F, respectively. The lower sanding-rollers E E are journaled in slides O O, that are mounted in grooves $o$ $o$ of the frame A and adapted to slide vertically thereon. These slides are adjustable vertically in said frame by means of screws O' O', that pass loosely through lugs $o^2$ $o^2$, mounted upon frame A, and engage screw-threaded lugs $o^3$ $o^3$, formed upon said slides. The screws are prevented from moving vertically within the lugs $o^2$ $o^2$ by collars $o^4$ $o^4$, applied thereto upon each side of said lugs.

Each of the screws $o'$ is provided at its lower end with a bevel-pinion $o^5$. The pinions of each sanding-cylinder are connected by a lateral shaft $o^6$, journaled in the frame and provided at each end with a bevel-pinion $o^7$, said pinions meshing with the pinions $o^5$ and thus causing their simultaneous rotation and the even elevation of both ends of the cylinder. The lateral shaft is rotated to cause this movement by a crank or wrench applied to the squared end $o^8$ thereof.

Each of the sanding-rollers comprises a shaft $p$, heads $p'$ mounted thereon, and having hollow cylinders $p^2$ cast integral therewith. The inner edges of these cylinders are rabbeted together, the joint being supported internally by a flanged disk $p^3$, secured to said cylinders. Each cylinder is formed with a longitudinal slot $p^4$, through which the edges of the felt or cloth covering $p^5$ are passed when the same is applied to the cylinder. The cloth first has its longitudinal edges secured in suitable slots formed in bolts $p^6$. The bolts are then slipped into the cylinder through suitable apertures in one of the heads, carrying the cloth which has been looped about the cylinder with it. After the bolts are in position they are rotated to tighten the cloth by winding the same about them. For turning said bolts a wrench is applied upon their squared ends. After the bolts are rotated they are locked in position by nuts $p^7$, applied on their outer ends and bearing against the head of the cylinder. It will be observed that these bolts perform the double function of securing the cloth covering in position and binding the two halves of the cylinder together. After the felt has been applied to the cylinder it is ready to receive the sandpaper. This is applied about the same and its ends inserted through the slot therein. These ends are grasped at each end of the cylinder by clamping-pliers R. Each of these pliers comprises two jaw-pieces $r$ $r$, pivoted upon a stud $r'$, which is adapted to slide in a slot $r^2$ of the head of the cylinder.

Each of the jaws is provided with an angular extended portion $r^3$, the ends of the said extended portions bearing, respectively, against guide-plates $r^4$ $r^4$, secured to the head of the cylinder. Each of these guide-plates is provided with a notched or reduced portion $r^5$, forming a shoulder $r^6$. The ends of the extended portions normally rest upon the part $r^5$ of the guides, with the jaws of the clamp open, but when they are moved toward the slots $p^4$ of the cylinders the said ends of the extended portions are forced inward by the shoulders $r^6$, thus clamping the jaws upon the edges of the sandpaper. This movement of said extended ends is accomplished by two pivoted links $r^7$ $r^7$, attached, respectively, to said ends and to each other. A slide $r^8$ is pivoted to said links where they are joined together and is provided with a dovetail projection $r^9$, secured thereto and adapted to slide in a dovetail groove $r^{10}$, cut in the head. The slide is provided at one edge with a rack $r^{11}$, adapted to be engaged by a gear-wheel $r^{12}$, mounted upon a shaft $r^{13}$, that extends fully across the cylinder to provide supporting means for the gear-wheel for operating the clamp upon the opposite head. This shaft has a projecting squared end $r^{14}$, whereby it may be operated by a wrench to actuate the clamps. It will be observed that upon turning the shaft $r^{13}$ the first action will be the closing of the clamps upon the edges of the paper, while the continued rotation of said shaft will elevate the clamps and stretch the paper tightly about the cylinder over the felt covering. Any wrinkle or slack that may be observed in the paper during its use may be taken up in the same manner.

The portion of frame A above a horizontal line drawn through the center of the cylinder E is movable vertically, whereby the cylinders are sufficiently uncovered to permit of new sandpaper being placed upon the same in a very convenient manner. This vertical adjustment of the frame is accomplished by vertical links S S, pendent from said frame upon opposite sides of the machine. These links are raised and lowered by levers $s$, attached thereto and keyed to lateral shafts $s'$, mounted in the frame. The lateral shafts are in turn connected together by levers $s'$ $s^2$, attached to the same and connected by a rod $s^3$. The lever $s^2$ has an extension $s^4$, to which is attached a long link $s^5$. This link is connected to a short lever $s^6$, mounted upon the shaft $l^3$, so that when the hand-lever $l^2$ is operated to stop the feed-rollers the upper portion of the frame will be lifted, as before described.

The upper sanding-cylinders F F are substantially similar to the cylinders E E and are mounted in a movable frame $A^4$. This frame is provided upon its sides with lugs $tt$, through which pass vertical screws $t^3$, said screws being journaled in suitable projections of the frame A. Each of these screws is provided at its upper end with a bevel-pinion $t^2$, said pinions being all connected by lateral rods $t^3$, having pinions $t^4$, and a longitudinal rod $t^5$, also provided with bevel-pinions $t^6$, all of said rods being journaled in suitable brackets of the frame. The rods $t^3$ have squared ends, whereby a wrench or crank may be applied to rotate the same, all of the vertical screws being thus rotated simultaneously to raise the frame $A^4$ evenly at all four corners.

A gage or pressure plate $v$ is mounted below the frame $A^4$ by means of screw-rods $u$, the upper sanding-rollers projecting through slots $u'$, formed in said plate. The lower ends of said screw-rods are screwed into blocks $u^2$, having trunnions $u^3$, secured in projections $u^4$ upon the upper surface of the plate $v$. This construction will permit one end or corner of the plate $v$ to be raised more than the remainder without affecting the vertical positions of the screws $u$. Each of the screws $u$ passes through a screw-threaded sleeve $u^5$, having an adjusting-nut $u^6$ at one end. The sleeves are prevented from moving up and down independent of the screws by collars $u^{15}$, applied on the latter above and below said sleeves. Each of these sleeves in turn passes through a screw-threaded aperture in a block $u^7$, pivotally mounted upon the end of a bell-crank lever $u^8$. These bell-crank levers are pivoted upon shafts $u^9$ in the frame $A^4$. The outer ends of the bell-crank levers are connected together by links $u^{10}$, so that all of said levers will be operated simultaneously. This movement of the bell-crank levers is accomplished by a screw $u^{11}$, secured to one of said bell-crank levers, and passes through a portion of frame $A^4$. This screw is provided with a nut $u^{12}$, having an operating-handle $u^{13}$, whereby the screw may be drawn longitudinally to operate the bell-cranks. The screw-rods $u$ are each provided at their upper ends with operating-wheels $u^{14}$. When it is desired to raise one side or corner of the plate $v$, the sleeve $u^5$, surrounding the screw which supports this corner or side, is rotated, with the desired result.

Figure 1:
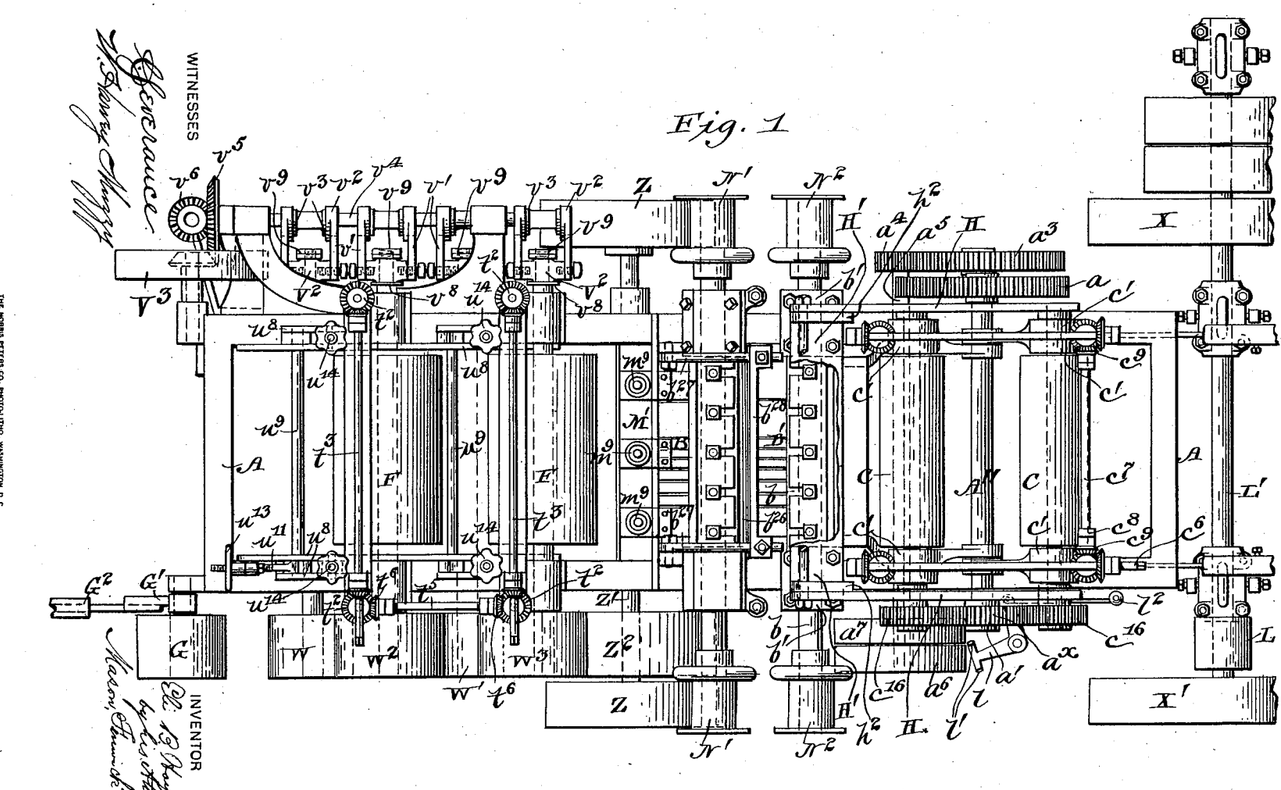
Figure 1 represents a plan view of the machine embodying my invention.
Figure 2:
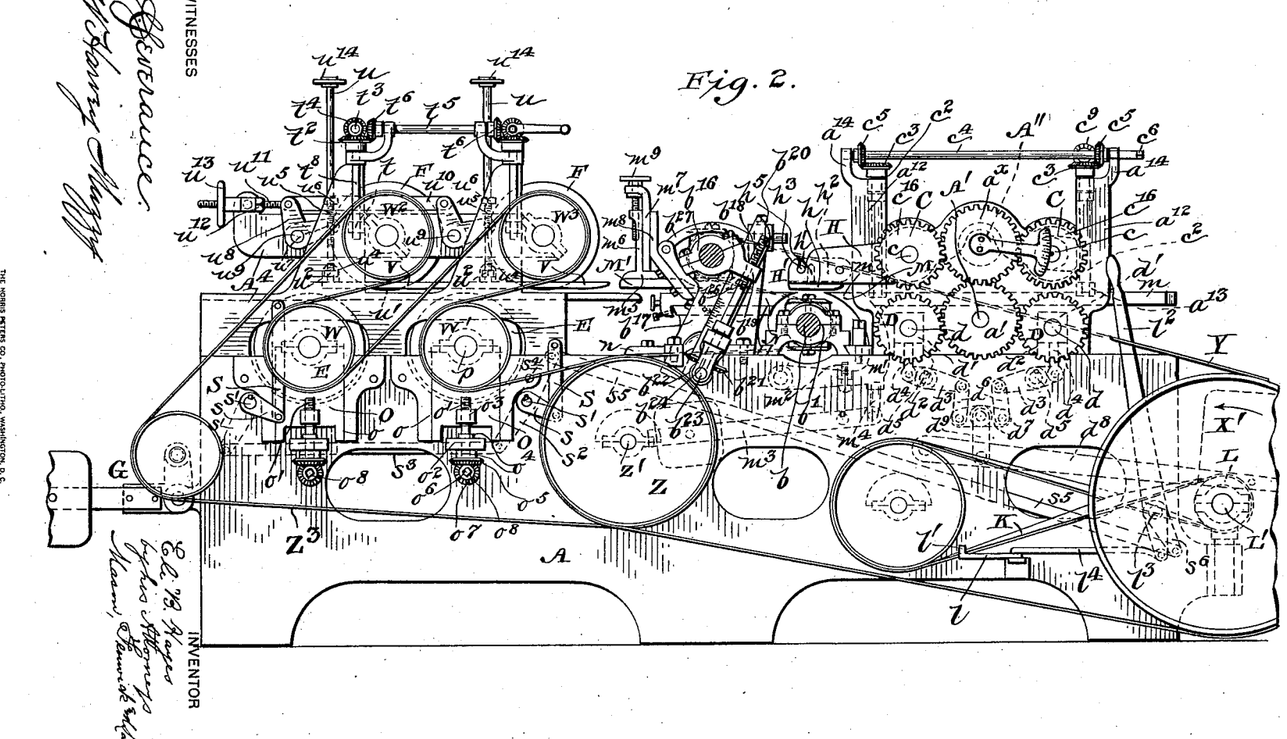
Fig. 2 represents a side elevation of the same.
Figure 3:
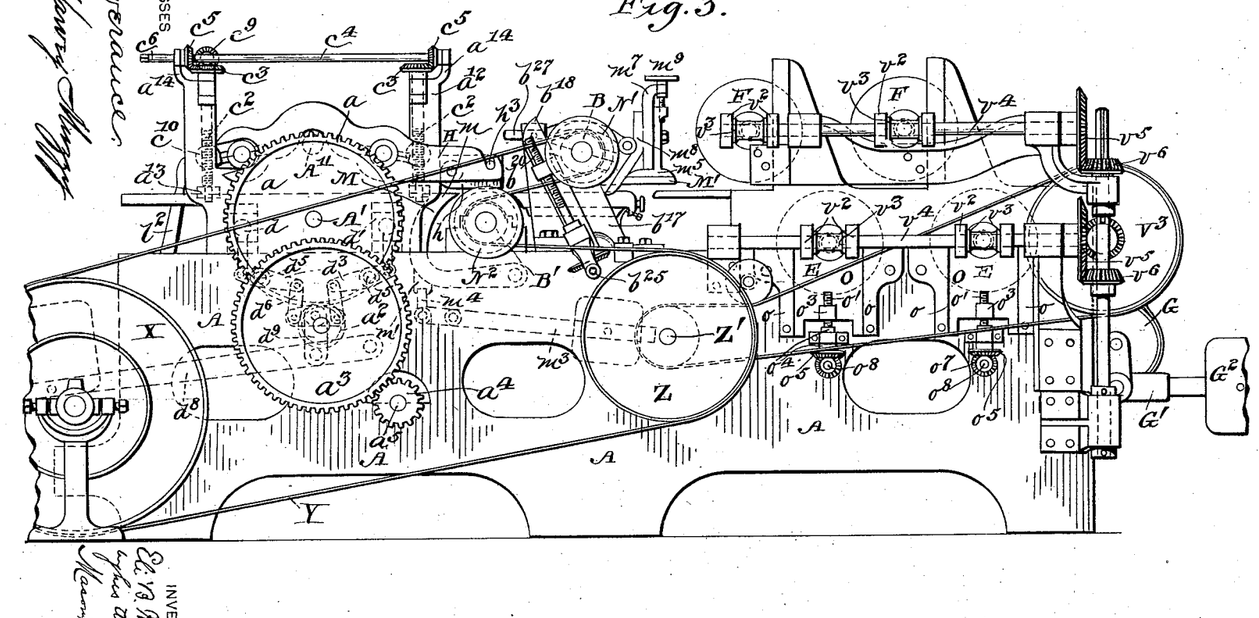
Fig. 3 represents a side elevation of said machine, taken on the opposite side from that shown in Fig. 2.
Figure 4:
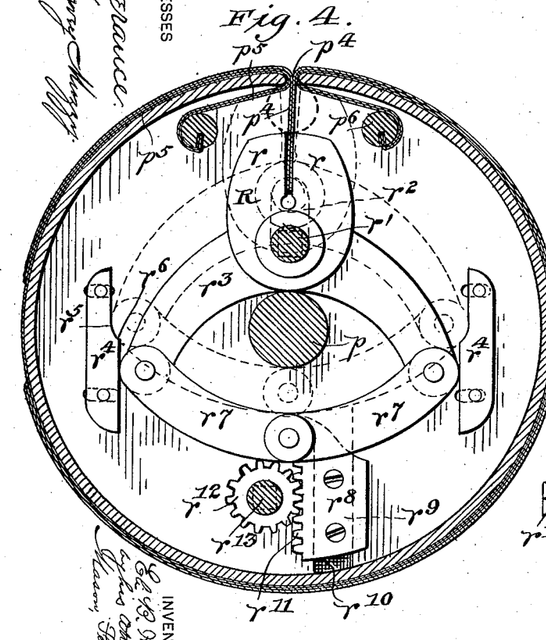
Fig. 4 represents a detail vertical transverse section through one of the sanding-rollers.
Figure 5:
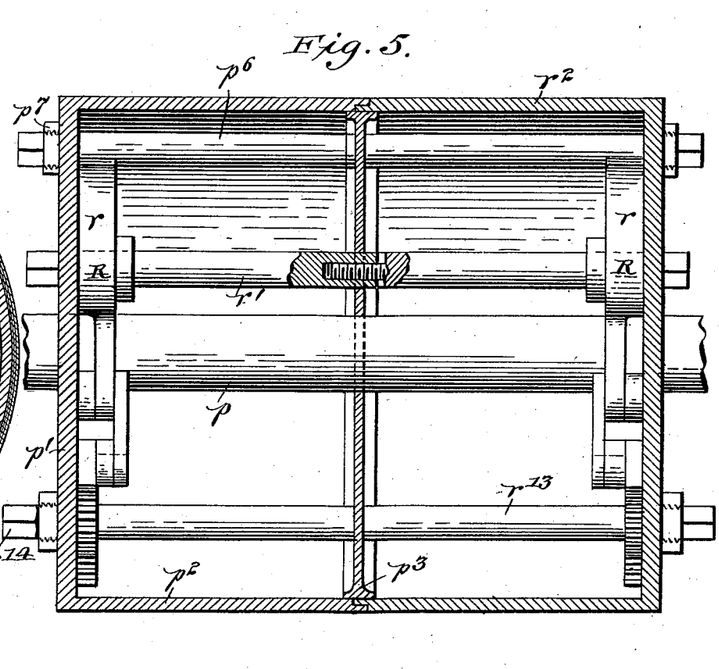
Fig. 5 represents a detail central vertical longitudinal section through the same.
Figure 6:
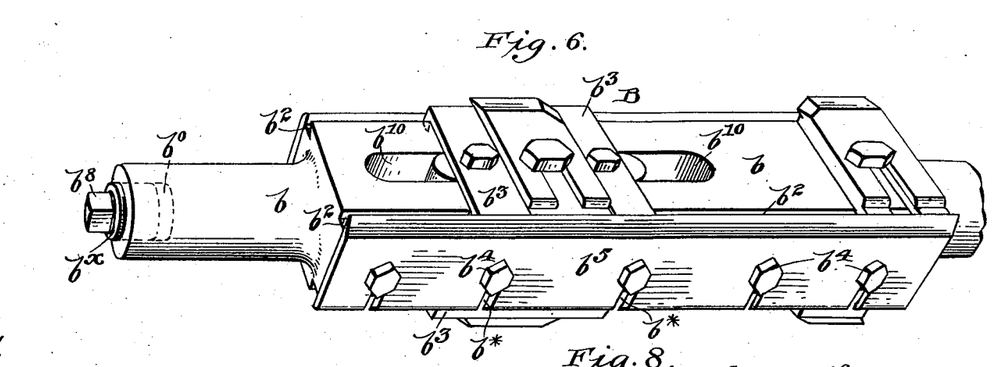
Fig. 6 represents a detail perspective view of the planer.
Figure 7:
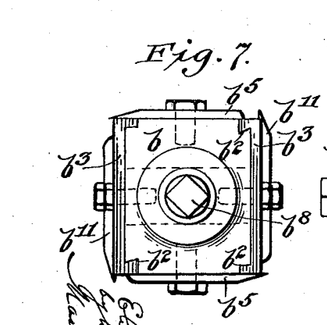
Fig. 7 represents an end elevation of the same.
Figure 8:
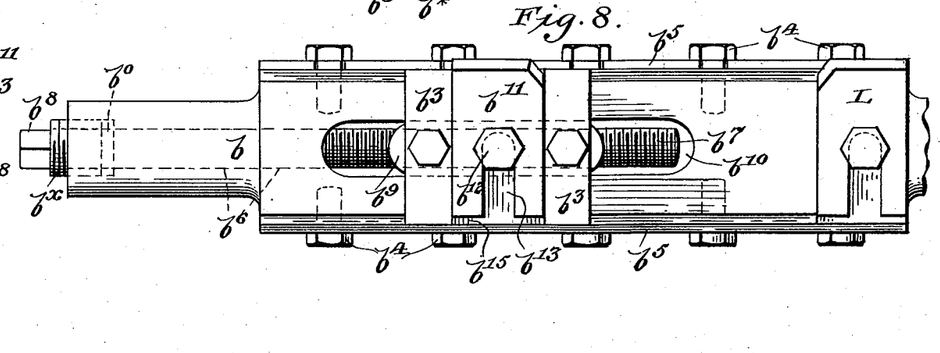
Fig. 8 represents a side elevation of said planer.
Figure 9:
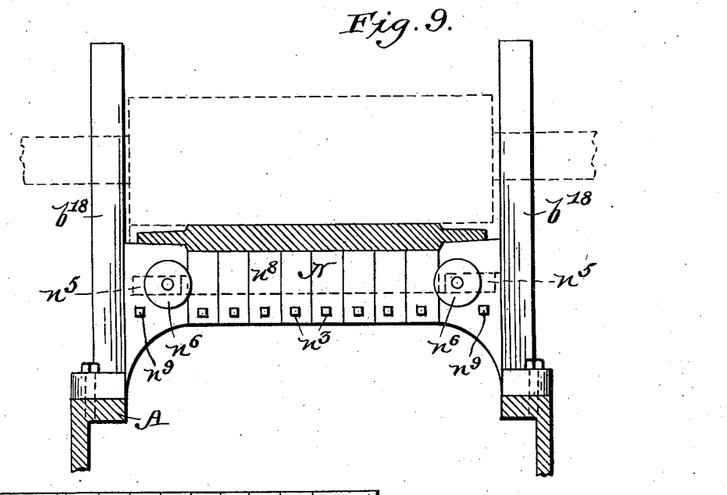
Fig. 9 represents an end elevation, partly in section, of the panel-supporting table under the upper planers.
Figures 10, 11:
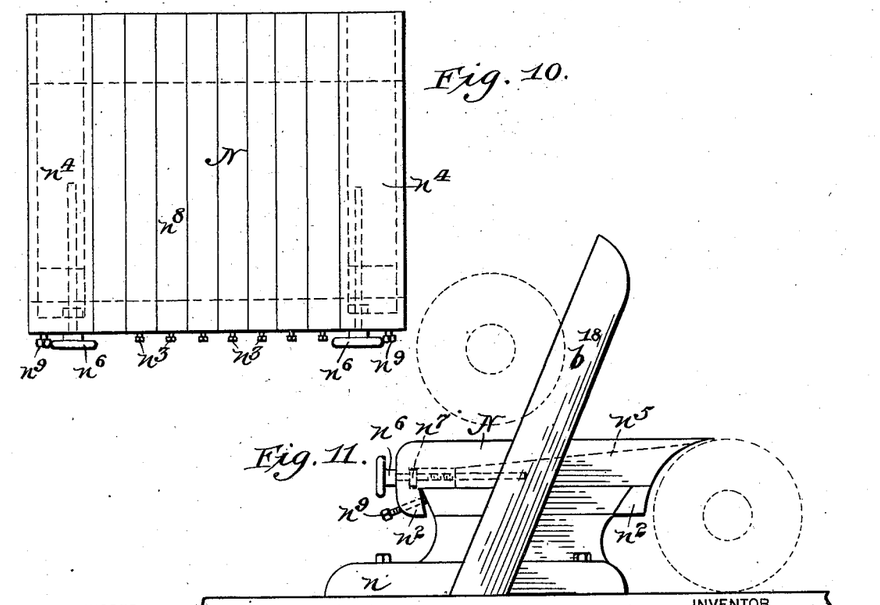
Fig. 10 represents a top plan view of the same.
Fig. 11 represents a detail side elevation of said table.
Figure 12:
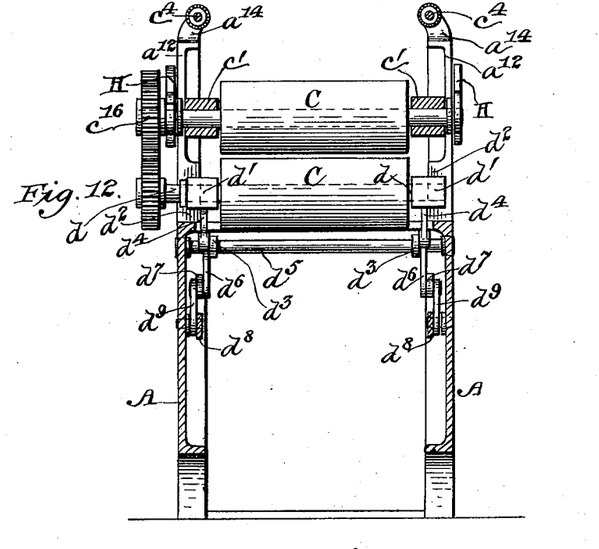
Fig. 12 represents a vertical transverse section through my improved machine on the line $xx$ of Fig. 1.
Figure 13:
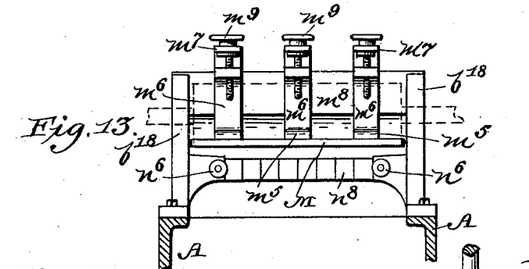
Fig. 13 represents a broken transverse vertical section of my said machine on the line $yy$, Fig. 1.
Figure 14:
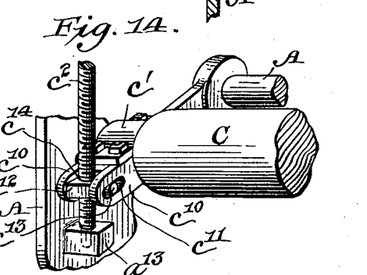
Fig. 14 represents a detail perspective view of one of the lever-journaled boxes and its adjusting-screw.
Figure 15:
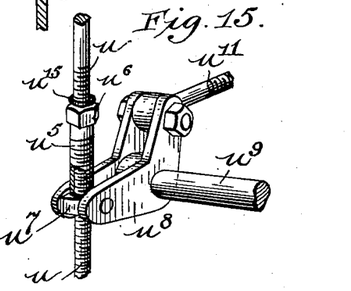
Fig. 15 represents a detail perspective view of one of the bell-crank levers and its mountings for raising and lowering the pressure-plate under the sanding-cylinder.
Figure 16:
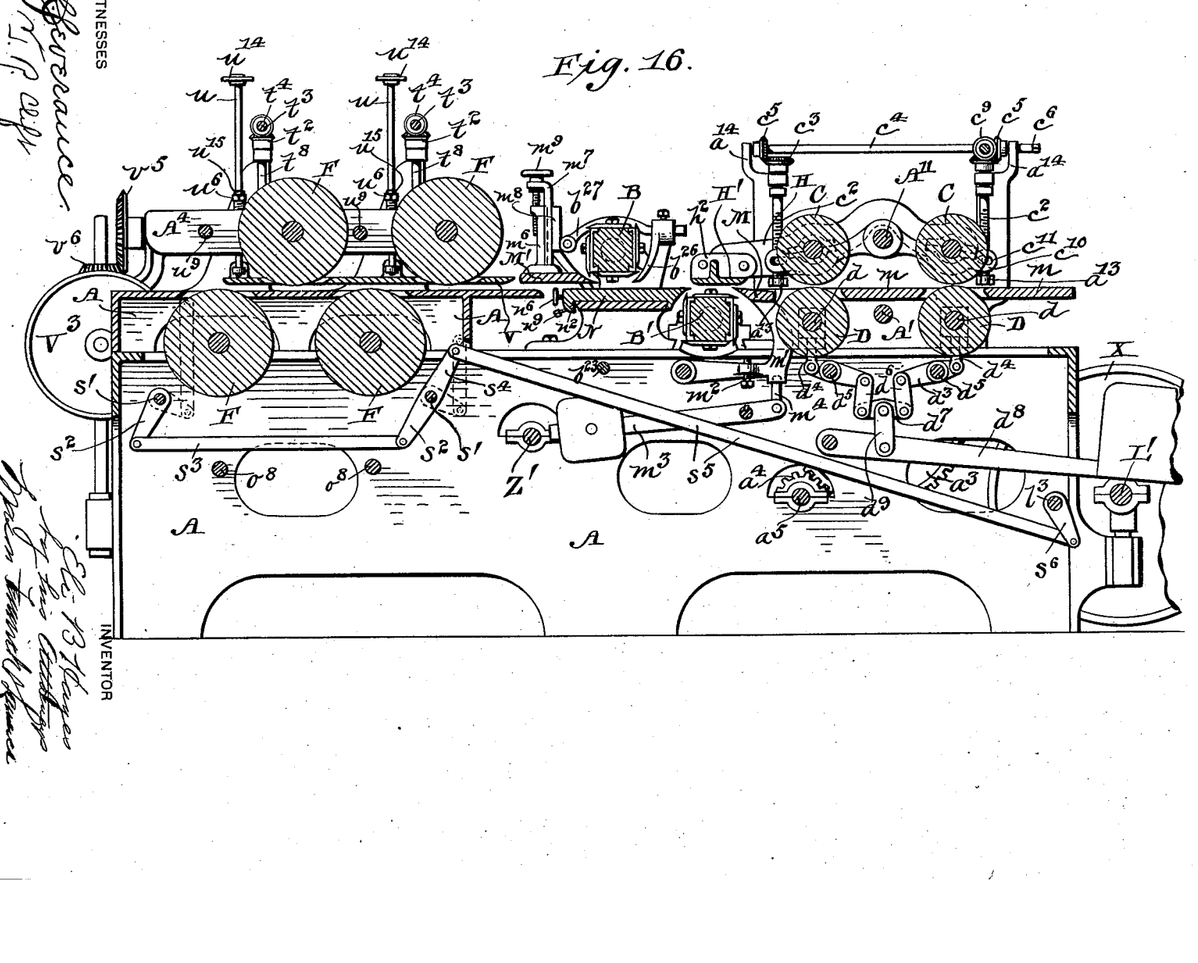
Fig. 16 is a vertical longitudinal section of my improved planer and sander.

The shaft of each sanding-cylinder is provided at one end with a small hub $V^2$, loosely mounted thereon, so as not to turn therewith, by washers and nuts $v^8$ and $v^9$, respectively. Pivotally connected to opposite sides of this hub are levers $v'$, that are provided at their outer free ends with loops or rings $v^2$. The rings surround eccentrics $v^3$, mounted upon a longitudinal shaft $v^4$. This shaft is journaled in suitable brackets of the frame and is connected to a power-wheel $V^3$, mounted upon the frame, by bevel-pinions $v^5$ $v^6$, as clearly shown in Fig. 3 of the drawings.

The operations of the above-described devices is to reciprocate their sanding-cylinders laterally while they are being rotated.

The lower sanding-cylinders are reciprocated laterally in the same manner as the upper sanders. Each shaft of the sanding-cylinders is provided at one end with a belt-wheel $w$, $w'$, $w^2$, and $w^3$, respectively. The main power-shaft of the machine is provided with two large belt-wheels X and X' for running power-belts upon opposite sides of the machine.

A belt Y passes from the wheel X up and over the wheel N', thence back around wheel $N^2$, and then about the wheel Z, fast upon a shaft Z', mounted in the frame, and then back again to the wheel X. The belt upon the opposite side of the machine is passed about similar pulleys and wheels upon the opposite side of the machine.

The shaft Z' is provided with an auxiliary belt-wheel $Z^2$. A belt $Z^3$ passes from this wheel forward and under the wheel W', then up and over the wheel $W^3$, then down and about the wheel W, then up and about the wheel $W^2$, and then down and about the belt-tightening pulley G and back to the wheel $Z^2$. The wheel G is mounted upon a bell-crank lever G', that is pivoted upon a frame A and provided at its outer end with a weight $G^2$, which tends to rock the bell-crank backward and thus tighten the belt $Z^2$.

It will be observed from the aforegoing description that my planing and sanding machine is particularly well adapted for planing and dressing all kinds of lumber in a very effective manner.

It is essential for securing the best results that some of the stock be taken off by one cylinder and one side be rendered perfectly flat and smooth before running upon the bed of the other cylinder, which will then finish the other surface and produce material of an even thickness throughout. I am enabled to accomplish this result by placing unyielding pressure-rollers and an unyielding pressure-plate opposite the first cutter and providing yielding feed-rollers and a yielding chip-breaker upon the side with the cutter. By this arrangement it will be seen that the rough lumber when presented to the first cutter will be held rigidly and evenly to the cutter, while any unevenness, roughness, or excess of thickness upon the side being cut will be accommodated by the yielding feed-rollers and yielding chip-breaker.

As it would be very difficult to arrange the yielding feed-rollers and yielding chip-breaker upon the upper part of the frame, both because the parts would be very much in the way of the operation of the machine and because it would produce a very cumbrous and inferior machine from a practical standpoint, I have found by practical experiment that the best and most approved manner of construction can be arrived at by making the first cutter a lower cutter and placing the yielding feed-rollers and the yielding chip-breaker in the main frame, which affords ample room for the necessary mechanism without interfering with other parts or being in the way of the operation of the machine.

It will thus be observed that my machine is adapted to take off the excess of thickness in the lumber from the under side when it is desirable, as is generally the case, because of the construction of the lower feeding-rollers and the chip-breaker, which permits them to descend under tension to accommodate said extra thickness.

It will be very apparent that my device is not only suitable for dressing panels, but is well adapted to be used for all kinds of planing. With it I am enabled to plane siding, moldings, flooring, and other like materials to the best advantage.

It is desirable and essential in planing double-surface siding that the surplus of stock should be taken off from one side and that it should be made to an even thickness by the first cutter, leaving just enough to plane for the other cutter.

It is a well-known fact that all double-surface siding is more or less black on one side, and it will be found that my planer is particularly well adapted for planing off all of the surplus stock from the discolored side by presenting it to the lower cylinder, with its yielding feed-rollers and chip-breaker, before it passes to the upper cylinder.

It will be further noticed that by taking off the surplus stock by the lower planer before running it onto the bed under the upper planer the upper cylinder has but little work to do, and it is much easier to hold such material to the bed than material of an uneven thickness.

When it is desired to produce a fancy surface only on one side, as in the case of molding, it is very desirable to remove the extra thickness from the other side, so as to run no risk of slivering the fancy surface. In this connection it may also be said that cutters for producing fancy molding-surfaces are often not as strong, because of their shape, as a plain flat cutter, and should therefore be subjected to as little strain as possible in cutting. This is accomplished in my device by causing the heavy cutting to be done on the plain side by the under cutter.

I have not shown my invention provided with the vertical spindles, as a flooring-machine, but it is a well-known fact that in all double planers it is only necessary to add these parts for matching the material in order to produce a complete flooring-machine. Now it will be apparent that my machine is particularly well adapted for planing lumber for flooring.

In planers heretofore used the flooring has been planed on top. Then the board is matched and runs a little farther along, and the bottom side is dressed after being matched. To this method is to be attributed much of the difficulty of mismatching, for any variation or slight change of the lower cylinder when it planes at the end of the machine in the old way causes the trouble of the flooring not facing correctly. Now in my machine, with the lower rollers yielding, the chip-breaker yielding, and the upper rollers set rigid, I am able to plane to a thickness before passing to the upper planer, so that the upper planer just cleans the bright side of the material, and it only remains to match the product in order to produce superior flooring which will face correctly, and it will not be necessary to plane again after matching.

Having now described my invention, what I claim as new, and desire to secure by Letters Patent, is—

1. In a planing-machine organized to plane both sides of lumber at one operation, the combination with a suitable frame, of a lower planer, lower feeding-rollers capable of vertical movement, shafts mounted in said machine parallel with the said feed-rollers, links connecting said rollers with said shafts and a weighted lever connected to said links whereby said rollers are adapted to be held against the lumber under yielding pressure and to have a movement parallel with said shafts, an upper planer and upper adjustable feed-rollers normally rigid against vertical movement, substantially as described.

2. In a planing-machine the combination with a suitable frame, of upper and lower planers, upper feed-rollers and lower feed-rollers, lower sanding-rollers, a frame mounted above the lower sanding-rollers, upper sanding-rollers mounted in said frame, an upper pressure-plate below said rollers also mounted upon said frame and means for adjusting the upper rollers and the said pressure-plate simultaneously by hand, substantially as described.

3. In a planing-machine, the combination with a suitable frame, of upper and lower planers, upper feeding-rollers, lower feeding-rollers vertically movable under tension, an upper chip-breaker movable under tension and pivoted to one side of the said cutter whereby the same is adapted to recede from the cutter upon being pressed upwardly, a chip-breaker for the lower cutter pivotally mounted in the frame below the cutter whereby upon pressing said chip-breaker downwardly its edge is caused to recede from the cutter, substantially as described.

4. In a planing-machine the combination with a suitable frame, of upper and lower planers, upper feeding-rollers, lower feeding-rollers vertically movable under tension and a chip-breaker for the lower cutter pivotally mounted in the frame below said cutter whereby upon pressing said chip-breaker downwardly its edge is caused to recede from the cutter, substantially as described.

5. In a planing-machine the combination of a suitable frame, upper and lower planers, an upper chip-breaker for the upper planer, and a lower chip-breaker pivotally mounted below the lower cutter, a shaft parallel with the said chip-breaker mounted in the frame, weighted levers keyed to said shaft and connected to said chip-breaker whereby the same is adapted to have a movement always parallel with the said shaft, upper and lower feed rollers and means for adjusting the same, substantially as described.

6. In a planing-machine the combination with a suitable frame, of feeding-rollers, upper and lower planers, a pressure-plate below the upper planer comprising a base, a plurality of surface strips detachably applied thereto whereby its width may be varied at will and means for raising and adjusting the outer strips up or down to accommodate various forms of material to be planed, substantially as described.

7. In a planing-machine the combination with a suitable frame of feeding-rollers, upper and lower planers, chip-breakers for each planer pivotally mounted in the frame in such a manner as to cause the same to recede from the planers upon pressure, a shaft mounted in the frame below the lower chip-breaker, weighted levers keyed to the said shaft upon each side of the machine and connected to said lower chip-breaker whereby the same is adapted to have a movement parallel with the said shaft throughout, substantially as described.

8. In a planing and sanding machine the combination with feeding-rollers, and planers, of sanding-cylinders, each comprising a hollow cylinder having a longitudinal slot, through which the edges of the sanding-paper may be slipped, tightening-clamps comprising pivoted jaws within said cylinder, links connected to said jaws and means for moving said links to cause said jaws to clamp and pull the paper to tighten it about the cylinder, substantially as described.

9. In a planing and sanding machine the combination with feeding-rollers and planers, of sanding-cylinders, a divided frame surrounding the same and adapted to rest upon and form a part of the frame proper when the machine is in use and links and a lever connected thereto for raising and lowering a portion of the frame at will to permit access to the cylinders for repairs or for applying a new sanding-paper covering, substantially as described.

10. In a planing and sanding machine the combination with feeding-rollers and planers, of lower sanding-cylinders mounted on vertical slides, means for adjusting said slides, simultaneously, an auxiliary frame above the frame proper, upper sanding-rollers mounted therein, an upper pressure-plate adjustably mounted in said auxiliary frame and means for adjusting said pressure-plate and upper sanding-rollers simultaneously, substantially as described.

11. In a planing and sanding machine the combination with feeding-rollers and planers, of lower sanding-cylinders, means for adjusting the same vertically, a vertically-movable frame, upper sanding-rollers mounted in the same, a pressure-plate also mounted upon said movable frame and independent adjusting-screws for raising and lowering the pressure-plate at different points or the whole of the same independently of the movable frame, substantially as described.

12. A sanding-cylinder for a planing and sanding machine comprising a hollow cylinder having a longitudinal slot through which the edges of the sanding-papers may be slipped, a tightening-clamp provided with pivoted jaws within said cylinder, operating-links connected to said jaws and means for moving said links for causing the jaws to clamp and pull said paper to tighten it about the cylinder, substantially as described.

In testimony whereof I hereunto affix my signature in presence of two witnesses.

ELI B. HAYES.

Witnesses:
WILLIAM C. BOUCK,
W. R. GREENLAW.